United States Patent
Jackson et al.

(10) Patent No.: US 11,293,847 B2
(45) Date of Patent: Apr. 5, 2022

(54) TEST SYSTEM AND METHODS FOR EVALUATING EROSION OF A TEST SAMPLE

(71) Applicant: ExxonMobil Upstream Research Company, Spring, TX (US)

(72) Inventors: Matthew S. Jackson, Houston, TX (US); Federico G. Gallo, Houston, TX (US); Christian S. Mayer, Pearland, TX (US); Dragan Stojkovic, Spring, TX (US); David Milton-Tayler, Weybridge (GB); James Goddings, Godalming (GB)

(73) Assignee: ExxonMobil Upstream Research Company, Spring, TX (US)

(*) Notice: Subject to any disclaimer, the term of this patent is extended or adjusted under 35 U.S.C. 154(b) by 44 days.

(21) Appl. No.: 16/848,080

(22) Filed: Apr. 14, 2020

(65) Prior Publication Data
US 2020/0371007 A1 Nov. 26, 2020

Related U.S. Application Data

(60) Provisional application No. 62/850,842, filed on May 21, 2019.

(51) Int. Cl.
*G01N 3/56* (2006.01)
*E21B 12/02* (2006.01)

(52) U.S. Cl.
CPC ............ *G01N 3/565* (2013.01); *E21B 12/02* (2013.01)

(58) Field of Classification Search
CPC .. G01N 3/565; G01N 33/36; G01N 2223/634; G01N 17/00; G01N 17/002; E21B 12/02
(Continued)

(56) References Cited

U.S. PATENT DOCUMENTS

| 4,493,206 A | 1/1985 | Johnson et al. |
| 5,211,677 A | 5/1993 | Sargeant et al. |

(Continued)

FOREIGN PATENT DOCUMENTS

| CN | 206248488 | | 6/2017 |
| CN | 2018-40734 | * | 5/2018 |
| CN | 2019-270545 | * | 3/2019 |

OTHER PUBLICATIONS

Manning, Nickolas, Performance of Ceramic Sand Screen for High Rate Gas Application—Gas Sand Screen Erosion Testing, Society of Petroleum Engineers, Oct. 2018, 19 pages, Australia.

(Continued)

*Primary Examiner* — Robert R Raevis

(74) *Attorney, Agent, or Firm* — ExxonMobil Upstream Research Company—Law Department

(57) ABSTRACT

Test systems and methods for evaluating erosion of a test sample. The test systems include a particulate distribution structure configured to receive a supplied particulate stream and to discharge a distributed particulate stream. The test systems also include a particulate acceleration structure configured to receive the distributed particulate stream and to generate an accelerated particulate stream. The test systems further include a test sample fixture configured to hold the test sample at a test sample location positioned such that the accelerated particulate stream is incident upon the test sample location. The methods include methods of operating the test systems.

22 Claims, 6 Drawing Sheets

(58) Field of Classification Search
USPC .......... 73/86, 7, 12.11, 78, 104, 146, 150 R, 73/159, 866, 865.9; 166/250.01
See application file for complete search history.

(56) References Cited

U.S. PATENT DOCUMENTS

| | | | | |
|---|---|---|---|---|
| 5,250,807 | A * | 10/1993 | Sontvedt | G01N 23/222 |
| | | | | 250/303 |
| 7,448,941 | B2 * | 11/2008 | Drew | B24C 7/0046 |
| | | | | 451/102 |
| 8,733,186 | B2 | 5/2014 | Lehman et al. | |
| 2013/0008649 | A1 | 1/2013 | Vestbostad et al. | |
| 2017/0343468 | A1 * | 11/2017 | Lehman | G01N 17/02 |
| 2018/0172576 | A1 * | 6/2018 | Young | G01N 17/002 |

OTHER PUBLICATIONS

DNV-GL, Managing sand production and erosion, Recommended Practice, Aug. 2015, 64 pages.

\* cited by examiner

TEST SYSTEM AND METHODS FOR EVALUATING EROSION OF A TEST SAMPLE

CROSS-REFERENCE TO RELATED APPLICATION

This application claims the benefit of U.S. Provisional Application 62/850,842 filed May 21, 2019 entitled TEST SYSTEM AND METHODS FOR EVALUATING EROSION OF A TEST SAMPLE, the entirety of which is incorporated by reference herein.

FIELD OF THE DISCLOSURE

The present disclosure relates generally to test systems and methods for evaluating erosion of a test sample.

BACKGROUND OF THE DISCLOSURE

Natural gas wells often extend within subterranean formations that include particulate material, such as sand. This particulate material may be entrained within the natural gas stream as it flows into the natural gas well, thereby generating a potential for abrasive erosion of components of the natural gas well, such as may be caused by impingement of the particulate material upon the components of the natural gas well. Gravel packs, screens, and the like may be utilized to decrease a potential for this particulate material to enter a wellbore of the natural gas well; however, these components also may be eroded by the particulate material. In addition, some particulate material may pass through the gravel packs and/or screens, thereby causing a potential for erosion of other, or upstream, natural gas well components.

Component erosion eventually may lead to degraded performance and/or failure of the components and/or of the natural gas well. As such, it may be desirable to quantify the abrasion-resistance of certain natural gas well components, thereby permitting components installed within a given natural gas well to be designed with a predetermined, or expected, component life. Thus, there exists a need for improved test systems and methods for evaluating erosion of a test sample.

SUMMARY OF THE DISCLOSURE

Test systems and methods for evaluating erosion of a test sample. The test systems include a particulate distribution structure. The particulate distribution structure includes a distribution structure inlet, which is configured to receive a supplied particulate stream that includes particulate material, and a distribution structure outlet, which is oriented along a particulate flow axis and configured to discharge a distributed particulate stream. The particulate distribution structure is configured to at least substantially uniformly distribute the particulate material within the distributed particulate stream.

The test systems also include a particulate acceleration structure. The particulate acceleration structure includes an acceleration structure inlet and an acceleration structure outlet, which are arranged along the particulate flow axis. The particulate acceleration structure also includes a motive gas inlet. The particulate acceleration structure is configured to receive the distributed particulate stream via the motive gas inlet and to receive a motive gas stream of a motive gas via the motive gas inlet. The particulate acceleration structure also is configured to combine the distributed particulate stream with the motive gas stream to accelerate the particulate material and generate an accelerated particulate stream. The particulate acceleration structure further is configured to discharge the accelerated particulate stream from the acceleration structure outlet.

The test systems further include a test sample fixture. The test sample fixture is configured to hold the test sample at a test sample location. The test sample location is positioned along the particulate flow axis such that the accelerated particulate stream is incident upon the test sample location.

The methods include methods of operating the test systems. The methods include providing the supplied particulate stream to the particulate distribution structure and distributing the supplied particulate stream, within the particulate distribution structure, to generate the distributed particulate stream. The methods also include discharging the distributed particulate stream from the particulate distribution structure and accelerating the distributed particulate stream within the particulate acceleration structure to generate the accelerated particulate stream. The methods further include flowing the accelerated particulate stream incident upon the test sample to erode the test sample.

DETAILED DESCRIPTION AND BEST MODE OF THE DISCLOSURE

Figure 1:
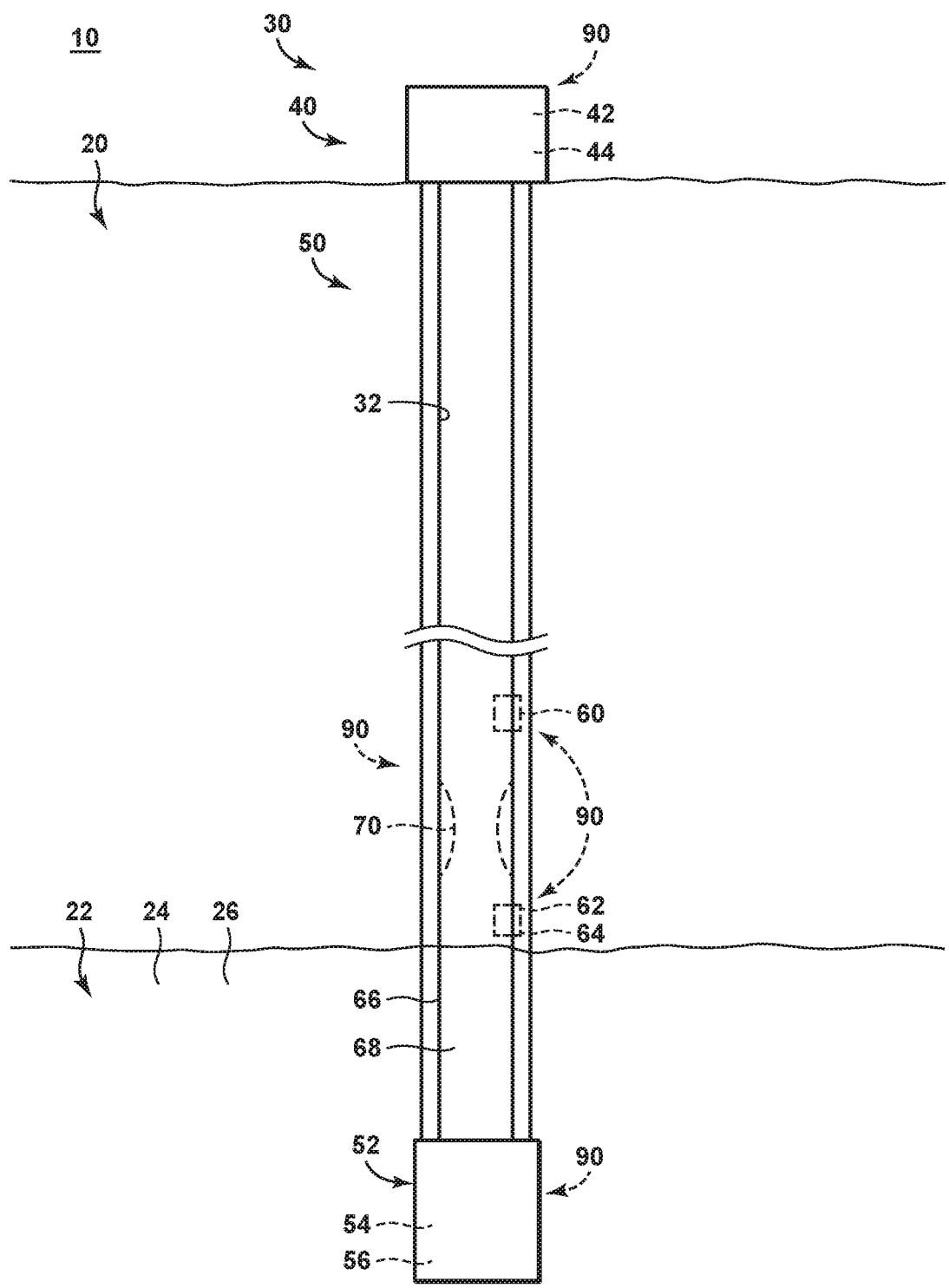
FIG. 1 is a schematic illustration of examples of a hydrocarbon well.

FIGS. 1-9 provide examples of hydrocarbon wells 30 that include structures that may be tested by test systems 100 and/or via methods 300, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of a hydrocarbon well 30. Hydrocarbon well 30 includes a wellbore 32 that extends within a subsurface region 20. Wellbore 32 also may be referred to herein as extending between a surface region 10 and a subterranean formation 22 that extends within subsurface region 20. Subterranean formation 22 may include hydrocarbon fluids 24, such as natural gas. Subterranean formation 22 also may include particulate material 26, such as sand.

Hydrocarbon well 30 may include one or more well components 40 that may be tested by, evaluated by, and/or utilized with test systems 100 and/or methods 300, according to the present disclosure. Stated another way, one or more well components 40 of hydrocarbon well 30 may be utilized as a test sample 90 for test systems 100 and/or methods 300, which are discussed in more detail herein. In this context, test systems 100 may be utilized to predict and/or model erosion of well components 40 prior to installation of the well components into the hydrocarbon well. This may include prediction and/or modeling of erosion of an entirety of a given well component 40, of a portion of the given well component 40, of a sub-structure of the given well component 40, and/or of a model structure that is predictive of performance of the given well component 40.

Examples of well components 40 of hydrocarbon well 30 may include a surface tree 42 and/or a surface choke 44 that may be utilized as test samples 90. Another example of well components 40 of hydrocarbon well 30 may include one or more downhole components 50 of the hydrocarbon well that may be utilized as test samples 90. Examples of downhole components 50 include a downhole tubular 66 that defines a tubular conduit 68 and extends within the wellbore, a region 70 of decreased inside diameter within tubular conduit 68, a safety valve 60, a gas lift valve 62, a check valve 64, and/or a filter structure 52, such as a screen 54 and/or a gravel pack 56.

Figure 2:
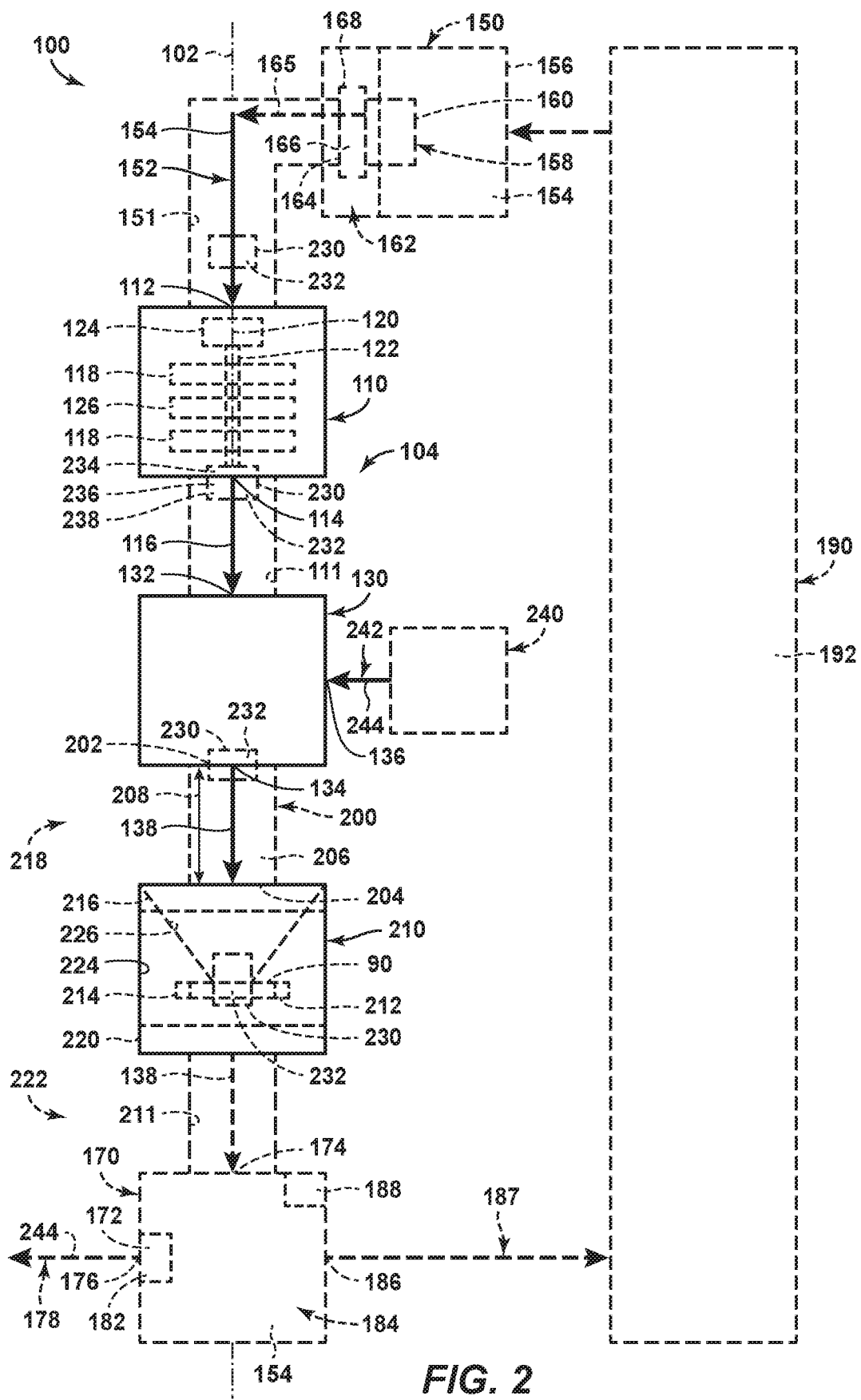
FIG. 2 is a schematic illustration of examples of a test system according to the present disclosure.
Figure 3:
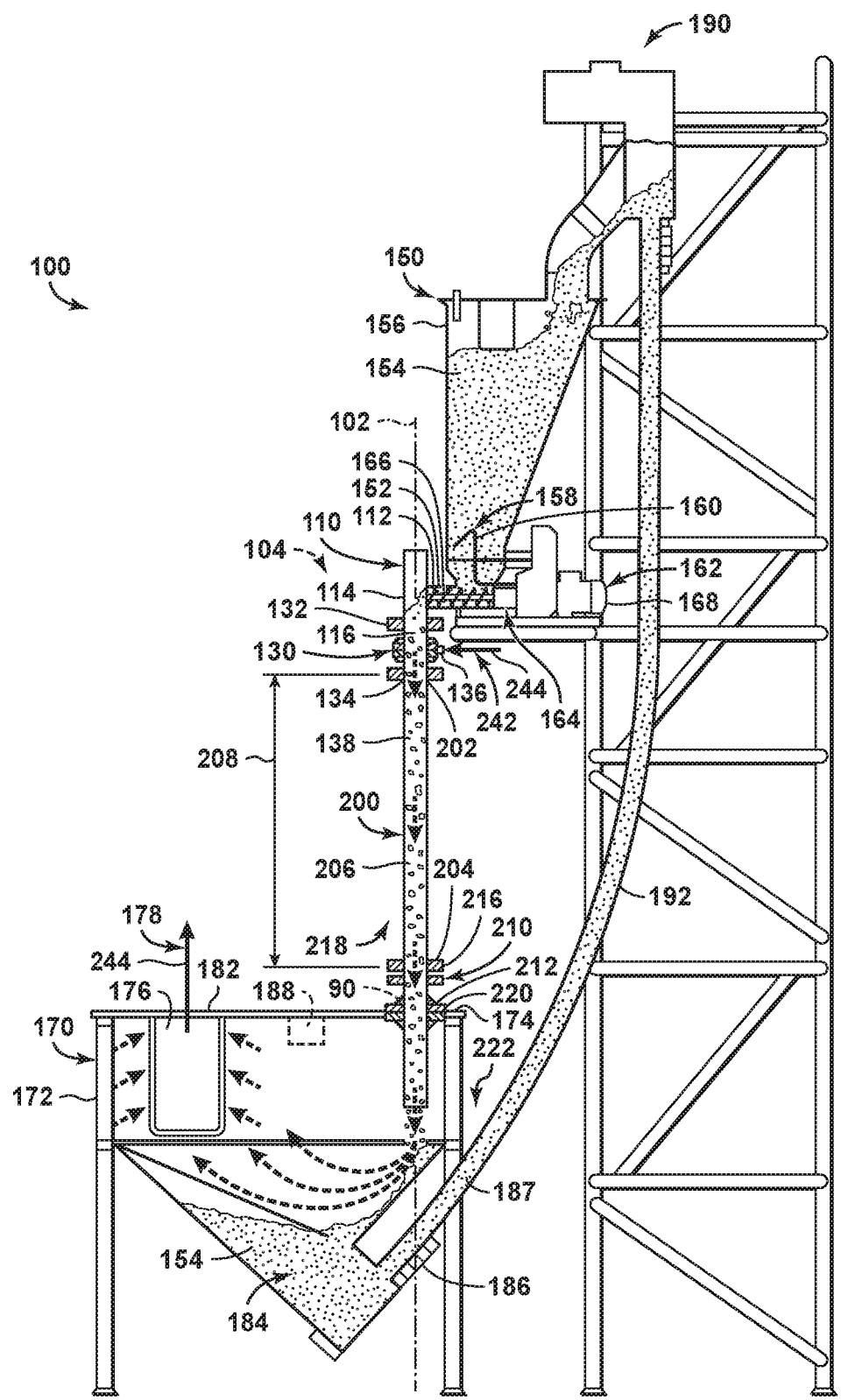
FIG. 3 is a less schematic illustration of examples of a test system according to the present disclosure.

FIG. 2 is a schematic illustration of examples of a test system 100 according to the present disclosure, and FIG. 3 is a less schematic illustration of examples of a test system 100. Test system 100 may be configured to evaluate erosion of a test sample 90, examples of which are disclosed herein. Test system 100 includes a particulate distribution structure 110, a particulate acceleration structure 130, and a test sample fixture 210.

During operation of test system 100, test sample 90 may be positioned within test sample fixture 210. Particulate distribution structure 110 receives a supplied particulate stream 152 that includes particulate material 154 and discharges a distributed particulate stream 116, such as via a distributed particulate stream supply conduit 111 that may extend between the particulate distribution system and particulate acceleration structure 130. The distributed particulate stream is received by particulate acceleration structure 130 and accelerated to generate an accelerated particulate stream 138. The accelerated particulate stream is directed incident upon test sample 90, thereby producing abrasive wear of the test sample. This abrasive wear may be measured and/or quantified, thereby permitting evaluation of erosion of a given test sample for a given set of experimental conditions.

Figure 5:
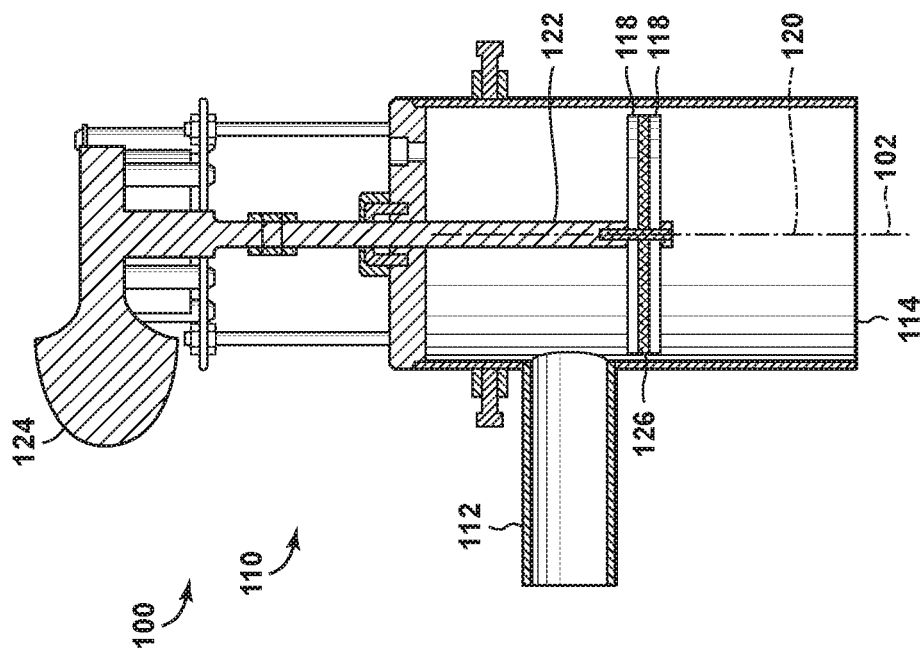
FIG. 5 is an illustration of the particulate distribution structure of FIG. 4 taken along line 5-5 of FIG. 4.
Figure 4:
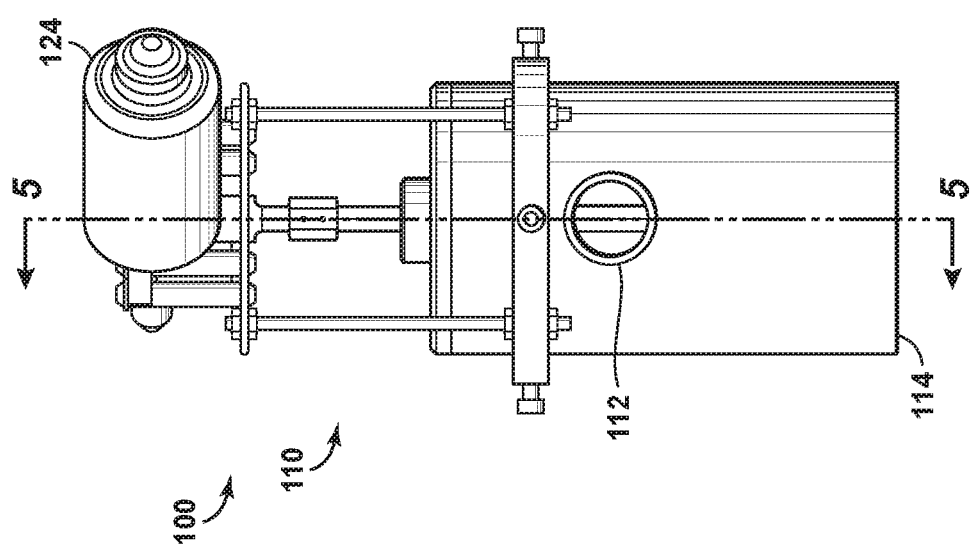
FIG. 4 is an illustration of an example of a particulate distribution structure according to the present disclosure.

Particulate distribution structure 110 is illustrated schematically in FIG. 2 and somewhat less schematically in FIG. 3. FIG. 4 is an illustration of an example of particulate distribution structure 110 according to the present disclosure, while FIG. 5 is an illustration of the particulate distribution structure of FIG. 4 taken along line 5-5 of FIG. 4.

As illustrated in FIGS. 2-4, particulate distribution structure 110 includes a distribution structure inlet 112 and a distribution structure outlet 114. As illustrated in FIGS. 2-3, distribution structure inlet 112 is configured to receive supplied particulate stream 152. Distribution structure outlet is oriented along a particulate flow axis 102 of the test system and is configured to discharge distributed particulate stream 116. Distribution structure inlet 112 may be, but is not required to be, oriented perpendicular, or at least substantially perpendicular, to the particulate flow axis.

Particulate distribution structure 110 is configured to distribute supplied particulate stream 152 such that particulate material 154 is uniformly, or at least substantially uniformly, distributed within the distributed particulate stream. Stated another way, a concentration of the particulate material within the distributed particulate stream may be uniform, or at least substantially uniform, across a plane that is oriented perpendicular to particulate flow axis 102 and/or across a transverse cross-section of distribution structure outlet 114.

Particulate distribution structure 110 may include any suitable structure that includes distribution structure inlet 112, that includes distribution structure outlet 114, that receives supplied particulate stream 152, and/or that discharges distributed particulate stream 116 along particulate flow axis 102. As an example, and as illustrated in FIGS. 2 and 4, particulate distribution structure 110 may include rotating member 118 that may be configured to distribute particulate material within the particulate distribution structure, across the plane that is oriented perpendicular to the particulate flow axis, and/or across the transverse cross-section of the distribution structure outlet. Examples of rotating member 118 include a propeller and/or a fan blade.

Rotating member 118 may be configured to rotate about an axis of rotation 120. Axis of rotation 120 may be parallel with, may be at least substantially parallel with, and/or may be at least partially coextensive with particulate flow axis 102. Rotation of rotating member 118 may be accomplished in any suitable manner. As an example, particulate distribution structure 110 may include a drive shaft 122 that operatively attaches rotating member 118 to a distribution motor 124. In this example, distribution motor 124 may be configured to rotate drive shaft 122 to rotate, or to provide a motive force for rotation of, rotating member 118.

As illustrated in dashed lines in FIG. 2 and in solid lines in FIG. 5, particulate distribution structure 110 additionally or alternatively may include a screen structure 126. Screen structure 126 may be positioned to receive particulate material subsequent to the particulate material being distributed by rotating member 118, such as to further distribute the particulate material. As an example, screen structure 126 may slow the fall of large clumps, or dunes, of particulate material, thereby providing time for rotating member 118 to distribute the particulate material.

As illustrated in dashed lines in FIG. 2 and in solid lines in FIG. 5, particulate distribution structure 110 may include a first rotating member 118 and a second rotating member 118. In this example, the first rotating member may be positioned on a first side of screen structure 126, and the second rotating member may be positioned on a second side of the screen structure. Stated another way, the first rotating member may be configured to distribute the particulate material prior to flow of the particulate material through the screen structure, and the second rotating member may be configured to distribute the particulate material subsequent to flow of the particulate material through the screen structure. Such a configuration may further decrease a potential for flow of large clumps, or dunes, of particulate material through the particulate material distribution structure and/or may further, or more uniformly, distribute the particulate material within distributed particulate stream 116. Drive shaft 122, or a single drive shaft 122, when present, may be configured to rotate both the first rotating member and the second rotating member.

Particulate acceleration structure 130 includes an acceleration structure inlet 132 configured to receive distributed particulate stream 116 and an acceleration structure outlet 134 configured to discharge accelerated particulate stream 138. Acceleration structure inlet 132 and acceleration structure outlet 134 are arranged along particulate flow axis 102. Stated another way, acceleration structure inlet 132 is configured to receive distributed particulate stream 116 along the particulate flow axis. Similarly, acceleration structure outlet 134 is configured to discharge accelerated particulate stream 138 along the particulate flow axis. Such a configuration may facilitate uniform distribution of particulate material within the accelerated particulate stream and/or may decrease a potential for particulate acceleration structure 130 to preferentially partition particulate material within a specific region, portion, or transverse cross-section of the accelerated particulate stream.

Particulate acceleration structure 130 also includes a motive gas inlet 136. The particulate acceleration structure is configured to receive a motive gas stream 242 that includes a motive gas 244 via the motive gas inlet and to combine the motive gas stream with the distributed particulate stream to accelerate the particulate material and produce and/or generate accelerated particulate stream 138.

Particulate acceleration structure 130 may include any suitable structure that includes acceleration structure inlet 132, that includes acceleration structure outlet 134, that includes motive gas inlet 136, that receives distributed particulate stream 116, that receives motive gas stream 242, and/or that discharges accelerated particulate stream 138. Examples of particulate acceleration structure 130 include a gas eductor, a gas ejector, a venturi, and/or a reverse venturi.

Test sample fixture 210 is configured to hold test sample 90 at a test sample location 212. Test sample location 212 is positioned along particulate flow axis 102 such that accelerated particulate stream 138 is incident upon the test sample location and/or upon the test sample when the test sample is positioned at, or in, the test sample location. Test sample fixture 210 is schematically illustrated in FIGS. 2-3, while FIGS. 6-8 are less schematic cross-sectional views illustrating examples of the text sample fixture.

Test sample fixture 210 may include any suitable structure that may hold the test sample at the test sample location, that may hold the test sample along particulate flow axis 102, and/or that may hold the test sample such that accelerated particulate stream 138 is incident thereupon. As an example, test sample fixture 210 may include a sample mounting structure 214 configured to hold the test sample at the test sample location. Examples of sample mounting structure 214 include any suitable clamp, clamping assembly, fastener, bolt, and/or flange.

It is within the scope of the present disclosure that test sample fixture 210 may be configured for selective installation into and/or removal from test system 100, such as to permit and/or facilitate testing of various and/or different test samples 90. As an example, test sample fixture 210 may include an upstream fixture mounting flange 216, which may be configured to mount, to selectively mount, and/or to separably mount the test sample fixture to an upstream component 218 of the test system. As another example, test sample fixture 210 may include a downstream fixture mounting flange 220, which may be configured to mount, to selectively mount, and/or to separably mount the test sample fixture to a downstream component 222 of the test system.

Figure 6:
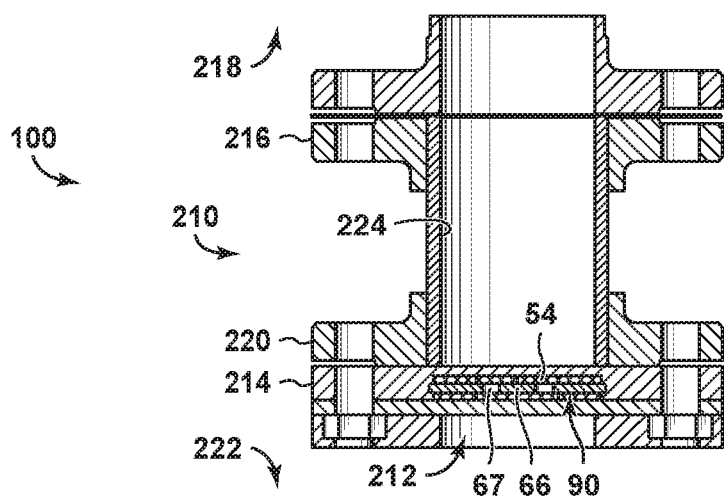
FIG. 6 is a cross-sectional view illustrating an example of a test sample fixture according to the present disclosure.
Figure 7:
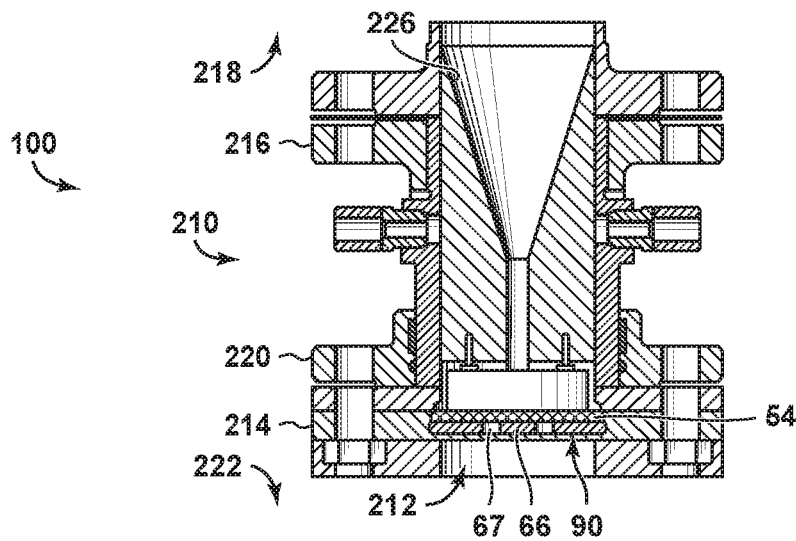
FIG. 7 is a cross-sectional view illustrating an example of a test sample fixture according to the present disclosure.
Figure 8:
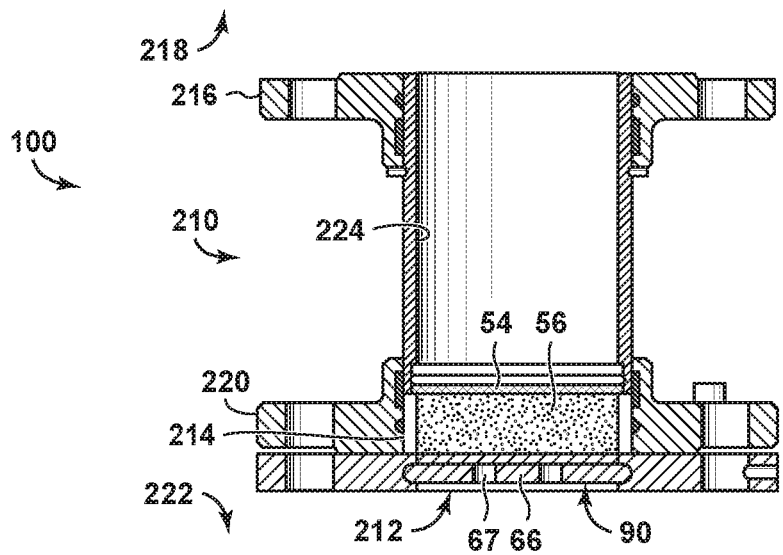
FIG. 8 is a cross-sectional view illustrating an example of a test sample fixture according to the present disclosure.

In some examples, and as illustrated in solid lines in FIGS. 2, 6, and 8 and indicated at 224, test sample fixture 210 may include and/or define a constant, or an at least substantially constant, internal cross-sectional area. The constant, or at least substantially constant, internal cross-sectional area may be measured within a plane that is perpendicular to particulate flow axis 102. State another way, a cross-sectional area of the test sample fixture may be constant, or at least substantially constant, along the particulate flow axis, at least in a region of the test sample fixture that is upstream of test sample 90. Such a configuration may provide uniform, or at least substantially uniform, impingement of particulate material onto the test sample across the internal cross-section of the test sample fixture and/or may be utilized to measure more diffuse erosion, such as of downhole tubulars 66, of screens 54, and/or of gravel packs 56.

In other examples, and as illustrated in dashed lines in FIG. 2 and in solid lines in FIG. 7 and indicated at 226, test sample fixture 210 may include and/or define a region of decreasing internal cross-sectional area as measured along the particulate flow axis. Region 226 may be at least partially conic and/or may define a restriction that may be shaped to focus the accelerated particulate stream on, or onto, a target region of the test sample. Such a configuration may provide focused and/or high-intensity impingement of particulate material onto the target region of the test sample and/or may be utilized to measure more focused erosion, such as of downhole tubulars 66 and/or of screens 54 that as may be caused by flow through perforations in a pipe.

Turning more specifically to FIGS. 6-8, FIG. 6 illustrates a test sample fixture 210 that may be utilized to model erosion of a screen 54 that is wrapped around a downhole tubular 66 that includes perforations, or holes 67. FIG. 7 illustrates a test sample fixture 210 that may be utilized to model erosion of a cased hole gravel pack, and FIG. 8 illustrates a test sample fixture 210 that may be utilized to mode erosion of an open hole gravel pack. In the example of FIG. 7, region 226 may focus flow of the particulate material into contact with a target region of the gravel pack in a manner similar to that experienced by a casing perforation within a hydrocarbon well. In the example of FIG. 8, area 224 may permit more uniform flow of the particulate material into contact with a broader region of the gravel pack in a manner similar to that experienced by more diffuse flow from a subterranean formation and through the gravel pack.

It is within the scope of the present disclosure that test system 100 may have, include, and/or define a straight, or an at least substantially straight, particulate material supply conduit 104 that may extend at least between distribution structure outlet 114 and test sample fixture 210 and/or test sample location 212. Stated another way, flow within the particulate material supply conduit may be along, or at least substantially only along, particulate flow axis 102. Conduit 104 may be cylindrical, or at least substantially cylindrical. Additionally or alternatively, conduit 104 and/or particulate flow axis 102 may be vertical, or at least substantially vertical. Such a configuration may improve a uniformity of particulate material distribution within accelerated particulate stream 138, as discussed. However, test system 100 is not required to maintain flow of particulate material along the particulate flow axis for regions of the test system that are upstream from distribution structure outlet 114 and/or that are downstream from test sample location 212, although flow along the particulate flow axis for these regions is within the scope of the present disclosure.

As illustrated in dashed lines in FIG. 2 and in solid lines in FIG. 3, test system 100 further may include a particulate supply system 150. Particulate supply system 150, when present, may be configured to supply, or to provide, supplied particulate stream 152 at a particulate stream supply rate, such as via a particulate stream supply conduit 151, that may extend between the particulate supply system and particulate distribution structure 110. Particulate supply system 150 also may be configured to accurately regulate, maintain, and/or adjust the particulate stream supply rate. As an example, particulate supply system 150 may be configured to regulate the particulate stream supply rate such that accelerated particulate stream 138 includes a target, a desired, and/or a predetermined mass concentration of particulate material in the motive gas.

Particulate supply system 150 may include any suitable structure that provides, generates, or discharges supplied particulate stream 152. As an example, particulate supply system 150 may include a particulate hopper 156 that may be configured to contain a volume of particulate material 154. Examples of particulate hopper 156 include a vertical hopper and/or a cylindrical hopper. When the particulate hopper includes the vertical hopper, the vertical hopper may increase a resistance to backflow of particulate material and/or motive gas within the test system.

As another example, particulate supply system 150 may include an agitator 158. Agitator 158 may be configured to agitate particulate material 154 within particulate hopper 156. Examples of agitator 158 include a mechanical mixing device 160, such as a blade and/or a paddle.

As yet another example, particulate supply system 150 may include a feed mechanism 162. Feed mechanism 162 may be configured to receive particulate material from the particulate hopper and to convey the particulate material from the particulate hopper to generate supplied particulate stream 152. Additionally or alternatively, feed mechanism 162 may be configured to selectively vary the particulate stream supply rate. An example of feed mechanism 162 includes a mechanical feed mechanism. A more specific example of feed mechanism 162 includes a screw feeder 164 that includes a feed screw 166 and a variable-speed feed motor 168 configured to selectively rotate the feed screw at a selected rotation rate. Screw feeder 164, when present, may be configured to convey the supplied particulate stream in a feeder discharge direction 165 that is horizontal, at least substantially horizontal, perpendicular to particulate flow axis 102, and/or at least substantially perpendicular to the particulate flow axis.

As illustrated in dashed lines in FIG. 2 and in solid lines in FIG. 3, test system 100 additionally or alternatively may include a containment structure 170. Containment structure 170, when present, may be configured to receive accelerated particulate stream 138, such as after the accelerated particulate stream is incident upon test sample location 212 and/or upon test sample 90 that is positioned at the test sample location. This may include receipt of the accelerated particulate stream via an interconnecting conduit 211 that may extend between test sample fixture 210 and the containment structure. Examples of containment structure 170 include a containment hopper 172, a cylindrical containment hopper, and/or an at least partially conic containment hopper.

Containment structure 170, when present, may include an accelerated particulate stream inlet port 174, which may be configured to receive the accelerated particulate stream. In some examples, accelerated particulate stream inlet port 174 may be configured to operatively attach containment structure 170 to test sample fixture 210 and/or to downstream fixture mounting flange 220 thereof.

Containment structure 170 may be configured to separate accelerated particulate stream 138 into particulate material 154 and motive gas 244. In addition, containment structure 170 may include a gas discharge port 176, and the containment structure may be configured to direct the motive gas toward the gas discharge port as a gas discharge stream 178.

Containment structure 170 further may include a particulate filter 182. Particulate filter 182 may be configured to remove particulate material from gas discharge stream 178 prior to flow of the gas discharge stream from the containment structure. Such a configuration may decrease a potential for, or a concentration of, particulate dust within an ambient atmosphere that is external to test system 100.

Test system 100 and/or containment structure 170 thereof also may include an air quality sensor 188. Air quality sensor 188, when present, may be configured to detect particulate material, or a concentration of particulate material, within the gas discharge stream and/or within the ambient atmosphere. Such a configuration may permit test system 100 to provide information to an operator of the test system regarding air quality within the ambient atmosphere.

Containment structure 170 further may include a particulate material retention region 184. Particulate material retention region 184 may be configured to retain particulate material 154, and containment structure 170 also may include a particulate material discharge port 186. Particulate material discharge port 186 may be configured to discharge particulate material 154 from particulate material retention region 184, such as to permit and/or facilitate disposal and/or recycling of the particulate material. This may include discharge of the particulate material as a used particulate material stream 187.

As illustrated in dashed lines in FIG. 2 and in solid lines in FIG. 3, test system 100 also may include a particulate material recycle structure 190. Particulate material recycle structure 190, when present, may be configured to convey particulate material, such as in used particulate material stream 187, from particulate material retention region 184 to particulate supply system 150. Particulate material recycle structure 190 may include any suitable structure that may receive particulate material 154 from the particulate material retention region and/or that may provide the particulate material to the particulate supply system. An example of particulate material recycle structure 190 includes a screw recycler 192.

As illustrated in dashed lines in FIG. 2 and in solid lines in FIG. 3, test system 100 further may include a downpipe 200. Downpipe 200, when present, may include, or may extend between, an inlet pipe end 202 and an outlet pipe end 204 and may define a downpipe conduit 206. Downpipe conduit 206 may extend along particulate flow axis 102. Downpipe 200 may be configured to receive accelerated particulate stream 138 from particulate acceleration structure 130 and/or via inlet pipe end 202. Downpipe 200 also may be configured to discharge accelerated particulate stream 138 via outlet pipe end 204 and/or to test sample fixture 210.

Downpipe 200 may have and/or define a downpipe length 208. Downpipe length 208 may be determined and/or selected to facilitate acceleration of particulate material 154 within the accelerated particulate stream prior to the accelerated particulate stream being incident upon test sample location 212.

As illustrated in dashed lines in FIG. 2, test system 100 may include one or more view ports 230. View port 230, when present, may be configured to permit and/or facilitate viewing of an internal region 232 of the test system while the test system is being utilized to test the test sample. This viewing may be from external the test system, and view port 230 may be configured to permit the viewing while also retaining particulate material 154 within the test system.

View port 230 may be configured and/or positioned to permit and/or facilitate viewing of any suitable internal region of test system 100 and/or stream that flows within the internal region. As examples, view port 230 may permit and/or facilitate viewing of supplied particulate stream 152, of distributed particulate stream 116, of accelerated particulate stream 138, of test sample location 212, and/or of test sample 90.

As also illustrated in dashed lines, test system 100 may include a particulate material concentration detection structure 234. Structure 234 may be associated with view port 230 and may be configured to detect a concentration of particulate material 154 within internal region 232. An example of structure 234 includes a light source 236, which may be configured to shine a light beam through internal region, and a light detector 238, which may be configured to detect an intensity of the light beam subsequent to the light beam being shined through the internal region.

As illustrated in dashed lines in FIG. 2, test system 100 may include a motive gas supply system 240. Motive gas supply system 240 may be configured to produce and/or generate motive gas stream 242 of motive gas 244 and/or to provide the motive gas stream to motive gas inlet 136 of particulate acceleration structure 130. Examples of motive gas 244 include air and/or compressed air. Examples of motive gas supply system 240 include a blower and/or a compressor.

It is within the scope of the present disclosure that motive gas supply system may be configured to provide the motive gas stream at a motive gas stream pressure and/or at a motive gas stream flow rate. The motive gas stream pressure and/or the motive gas stream flow rate may be selected based, at least in part, on conditions within and/or production rates from a subterranean formation for which erosion of test sample 90 is being determined.

Examples of the motive gas stream pressure include pressures of at least 1 kilopascal (kPa), at least 2 kPa, at least 3 kPa, at least 4 kPa, at least 5 kPa, at least 6 kPa, at least 7 kPa, at least 8 kPa, at least 9 kPa, at least 10 kPa, at most 30 kPa, at most 25 kPa, at most 20 kPa, at most 19 kPa, at most 18 kPa, at most 17 kPa, at most 16 kPa, at most 15 kPa, at most 14 kPa, at most 13 kPa, at most 12 kPa, and/or at most 11 kPa. Examples of the motive gas stream flow rate include flow rates of at least 20 liters per minute (LPM), at least 30 LPM, at least 40 LPM, at least 50 LPM, at least 60 LPM, at least 70 LPM, at least 80 LPM, at least 90 LPM, at least 100 LPM, at least 125 LPM, at least 150 LPM, at least 175 LPM, at least 200 LPM, at least 250 LPM, at least 300 LPM, at most 1000 LPM, at most 800 LPM, at most 600 LPM, at most 500 LPM, at most 450 LPM, at most 400 LPM, at most 350 LPM, and/or at most 300 LPM.

Particulate material 154 may include any suitable material that may erode and/or abrade test sample 90, that may be present within a subterranean formation, and/or that may model particulate material that may be present within the subterranean formation. Examples of particulate material 154 include sand and/or silicon carbide.

Particulate material 154 may have and/or define any suitable particle size, particle diameter, effective particle diameter, and/or maximum particle extent. Examples of the effective particle diameter include diameters of at least 1 micrometer, at least 2 micrometers, at least 3 micrometers, at least 4 micrometers, at least 5 micrometers, at least 6 micrometers, at least 8 micrometers, at least 10 micrometers, at least 15 micrometers, at least 20 micrometers, at least 30 micrometers, at least 40 micrometers, at least 50 micrometers, at least 60 micrometers, at most 200 micrometers, at most 150 micrometers, at most 125 micrometers, at most 100 micrometers, at most 90 micrometers, at most 80 micrometers, at most 70 micrometers, at most 60 micrometers, and/or at most 50 micrometers.

The particle size and/or composition may be selected based upon a variety of factors. Examples of these factors may include site conditions within a given hydrocarbon well, expected particle sizes within the given hydrocarbon well, assumptions regarding particle sizes that will flow through a gravel pack within the given hydrocarbon well, and/or measurement of size and/or composition of particles produces from the given hydrocarbon well.

Figure 9:
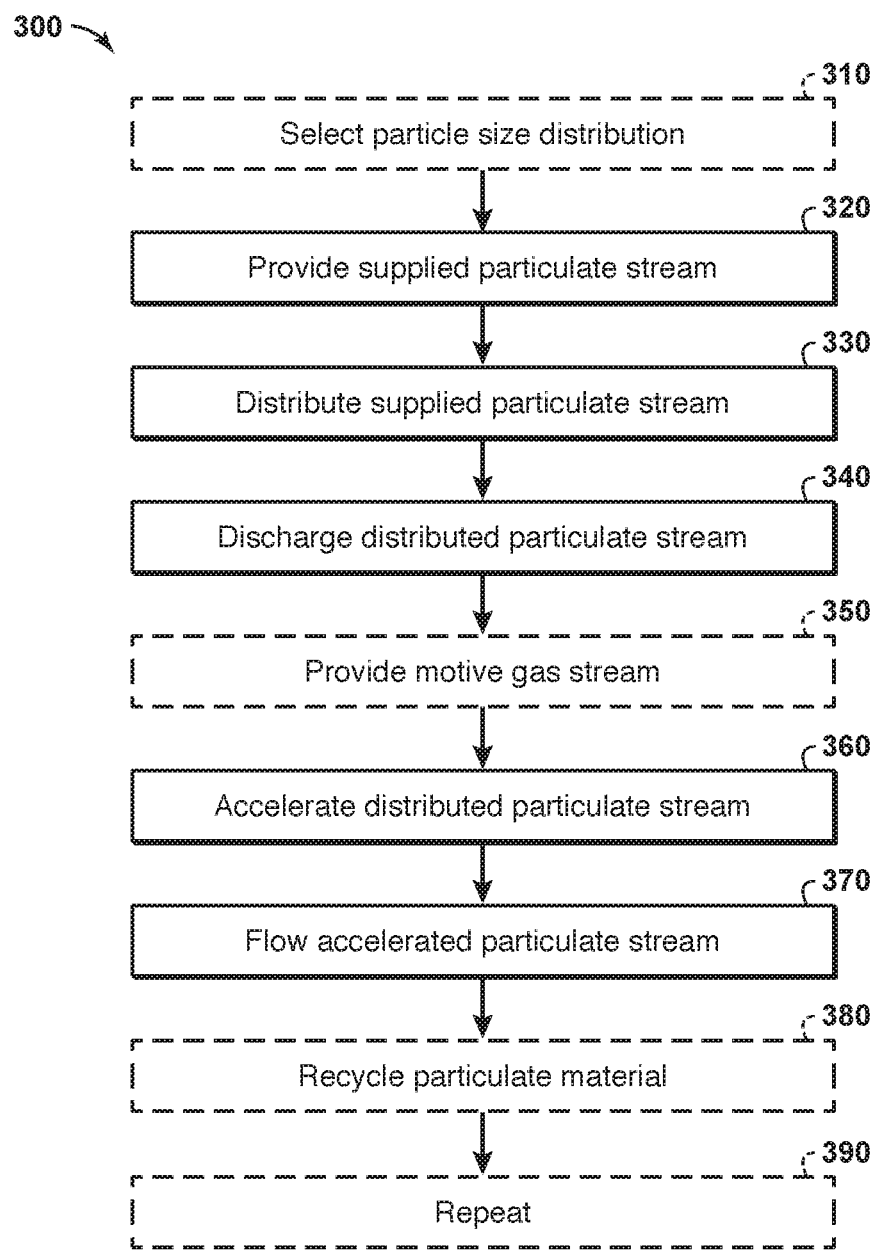
FIG. 9 is a flowchart depicting examples of methods of utilizing a test system, according to the present disclosure.

FIG. 9 is a flowchart depicting methods 300 of utilizing a test system, according to the present disclosure, such as test system 100 of FIGS. 2-3. Methods 300 may include selecting a particle size distribution at 310 and include providing a supplied particulate stream at 320 and distributing the supplied particulate stream at 330. Methods 300 also include discharging a distributed particulate stream at 340 and may include providing a motive gas stream at 350. Methods 300 also include accelerating the distributed particulate stream at 360 and flowing an accelerated particulate stream at 370. Methods 300 further may include recycling particulate material at 380 and/or repeating at least a portion of the methods at 390.

Selecting the particle size distribution at 310 may include selecting the particle size distribution for particulate material that is included in, that defines, and/or that forms the supplied particulate stream. The selecting at 310 may be based upon any suitable criteria. As an example, the selecting at 310 may include selecting based, at least in part, on an expected particle size distribution within a subsurface region within which a test sample, which is tested by the methods, is configured to be utilized.

Providing the supplied particulate stream at 320 may include providing the supplied particulate stream to a particulate distribution structure. Examples of the particulate distribution structure are disclosed herein with reference to particulate distribution structure 110 of FIGS. 2-5. Examples of the supplied particulate stream are disclosed herein with reference to supplied particulate stream 152 of FIGS. 2-3.

The providing at 320 additionally or alternatively may include providing the supplied particulate stream with a particulate supply system. Examples of the particulate supply structure are disclosed herein with reference to particulate supply system 150 of FIGS. 2-3.

It is within the scope of the present disclosure that the providing at 320 may include regulating a particulate supply rate of the supplied particulate stream. This may include regulating the particulate supply rate such that a concentration of the particulate material in the accelerated particulate stream is at most a threshold mass concentration of particulate material in motive gas and/or is within a target, or a predetermined, mass concentration range. Such a configuration may decrease particle-to-particle interactions among the particles that are included in the particulate material, thereby permitting a more straight, or more directed, flow of the accelerated particulate stream during the flowing at 370. Examples of the threshold mass concentration and/or of the target mass concentration range include mass concentrations of at least 0.001 kilograms per cubic meter ($kg/m^3$), at least 0.005 $kg/m^3$, at least 0.01 $kg/m^3$, at least 0.015 $kg/m^3$, at least 0.02 $kg/m^3$, at least 0.03 $kg/m^3$, at least 0.04 $kg/m^3$, at least 0.05 $kg/m^3$, at least 0.06 $kg/m^3$, at least 0.07 $kg/m^3$, at least 0.08 $kg/m^3$, at least 0.1 $kg/m^3$, at least 0.2 $kg/m^3$, at least 0.3 $kg/m^3$, at least 0.4 $kg/m^3$, at least 0.5 $kg/m^3$, at most 1 $kg/m^3$, at most 0.9 $kg/m^3$, at most 0.8 $kg/m^3$, at most 0.7 $kg/m^3$, at most 0.6 $kg/m^3$, at most 0.5 $kg/m^3$, at most 0.4 $kg/m^3$, at most 0.3 $kg/m^3$, at most 0.2 $kg/m^3$, at most 0.1 $kg/m^3$, at most 0.05 $kg/m^3$, at most 0.025 $kg/m^3$, at most 0.01 $kg/m^3$, and/or at most 0.005 $kg/m^3$.

The providing at 320 additionally or alternatively may include selectively varying the particulate stream supply rate of the supplied particulate stream to regulate a concentration of particulate material in the supplied particulate stream based, at least in part, on an expected downhole environment within which the test sample may be utilized. Such a configuration may provide more accurate information regarding how a given test sample is eroded within a given downhole environment.

Distributing the supplied particulate stream at 330 may include distributing the supplied particulate stream within the particulate distribution structure. This may include distributing to produce and/or generate a distributed particulate stream. Examples of the distributed particulate stream are disclosed herein with reference to distributed particulate stream 116 of FIGS. 2-3.

The distributing at 330 may include uniformly, or at least substantially uniformly, distributing the particulate material within the distributed particulate stream. The distributing at 330 additionally or alternatively may include agitating and/or screening the particulate material in the supplied particulate stream, such as to distribute the particulate material.

Discharging the distributed particulate stream at 340 may include discharging the distributed particulate stream from the particulate distribution structure. The distributed particulate stream may be produced within the particulate distribution structure and/or during the distributing at 330, as is disclosed herein.

The discharging at 340 may include discharging with, via, and/or utilizing a distribution structure outlet of the particulate distribution structure. The discharging at 340 additionally or alternatively may include discharging in a downward, or at least substantially downward, direction and/or discharging parallel, or at least substantially parallel, to the particulate flow axis.

Providing the motive gas stream at 350 may include providing the motive gas stream to a motive gas inlet of the particulate acceleration structure. When methods 300 include the providing at 350, the accelerating at 360 may include accelerating the distributed particulate stream within the motive gas stream to generate the accelerated particulate stream. Stated another way, the providing at 350 may produce, may generate, and/or may provide a motive force for the accelerating at 360.

It is within the scope of the present disclosure that the providing at 350 may include regulating a motive gas supply rate of the motive gas stream. This may include regulating the motive gas supply rate such that a concentration of the particulate material in the accelerated particulate stream is at most a threshold mass concentration of the particulate material in the motive gas, as discussed herein. The providing at 350 additionally or alternatively may include selectively varying a motive gas supply rate of the motive gas stream to regulate the concentration of the particulate material in the accelerated particulate stream. This selective variation of the motive gas supply rate may be based, at least in part, on the expected downhole environment for the test sample, as discussed herein.

The providing at 350 may include providing the motive gas stream at any suitable motive gas supply rate, examples of which are disclosed herein. The providing at 350 additionally or alternatively may include selectively varying the motive gas supply rate to maintain an accelerated particulate stream speed of the accelerated particulate stream at a target, or desired, speed. Examples of the target speed include speeds of at least 1 meter per second (m/s), at least 2 m/s, at least 3 m/s, at least 4 m/s, at least 5 m/s, at least 6 m/s, at least 8 m/s, at least 10 m/s, at least 15 m/s, at most 40 m/s, at most 35 m/s, at most 30 m/s, at most 25 m/s, at most 20 m/s, at most 15 m/s, at most 10 m/s, or at most 5 m/s.

Accelerating the distributed particulate stream at 360 may include accelerating the distributed particulate stream with, via, and/or utilizing a particulate acceleration structure. This may include accelerating to produce and/or generate an accelerated particulate stream. Examples of the particulate acceleration structure are disclosed herein with reference to particulate acceleration structure 130 of FIGS. 2-3. Examples of the accelerated particulate stream are disclosed herein with reference to accelerated particulate stream 138 of FIGS. 2-3.

Flowing the accelerated particulate stream at 370 may include flowing the accelerated particulate stream incident upon, into contact with, and/or into abrasive contact with the test sample. This may include flowing to test, to erode, and/or to abrade the test sample. The flowing at 370 may include flowing at any suitable accelerated particulate material stream speed, examples of which are disclosed herein. The flowing at 370 additionally or alternatively may include flowing through a downpipe that extends between the particulate acceleration structure and the test sample, as discussed herein.

Recycling particulate material at 380 may include recycling the particulate material as a recycled particulate material stream and providing the recycled particulate material stream to the particulate distribution structure as the supplied particulate stream. The recycling at 380 may be accomplished in any suitable manner. As an example, the recycling at 380 may include, subsequent to the flowing at 370, capturing the particulate material within a containment structure, such as containment structure 170 that is discussed herein with reference to FIGS. 2-3. As another example, the recycling at 380 may include conveying the particulate material, as the recycled particulate material stream with and/or within a particulate material recycle structure, such as particulate material recycle structure 190 that is discussed herein with reference to FIGS. 2-3. As yet another example, the recycling at 380 may include providing the recycled particulate material stream to the particulate supply system.

Repeating at least the portion of the methods at 390 may include repeating any suitable portion of methods 300 in any suitable manner. As an example, the test sample may be a first test sample, and the repeating at 390 may include replacing the first test sample with a second test sample that differs from the first test sample. Methods 300 then may include repeating the selecting at 310, the providing at 320, the distributing at 330, the discharging at 340, the providing at 350, the accelerating at 360, the flowing at 370, and/or the recycling at 380 to evaluate erosion of the second test sample.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A test system for evaluating erosion of a test sample, the test system comprising:
   a particulate distribution structure having a distribution structure inlet, which is configured to receive a supplied particulate stream that includes particulate material, and a distribution structure outlet, which is oriented along a particulate flow axis of the test system and is configured to discharge a distributed particulate stream, wherein the particulate distribution structure is configured to distribute the supplied particulate stream such that the particulate material is at least substantially uniformly distributed within the distributed particulate stream;
a particulate acceleration structure having an acceleration structure inlet arranged along the particulate flow axis, an acceleration structure outlet arranged along the particulate flow axis, and a motive gas inlet, wherein the particulate acceleration structure is configured to receive the distributed particulate stream via the acceleration structure inlet, to receive a motive gas stream of a motive gas via the motive gas inlet, to combine the distributed particulate stream with the motive gas stream to accelerate the particulate material and generate an accelerated particulate stream, and to discharge the accelerated particulate stream from the acceleration structure outlet; and
a test sample fixture configured to hold the test sample at a test sample location that is positioned along the particulate flow axis such that the accelerated particle stream is incident upon the test sample location, wherein the test system further includes a downpipe having an inlet pipe end and an opposed outlet pipe end and defining a downpipe conduit that extends along the particulate flow axis between the inlet pipe end and the outlet pipe end, wherein the downpipe is configured to receive the accelerated particulate stream via the inlet pipe end and to discharge the accelerated particulate stream from the outlet pipe end.

2. The test system of claim 1, wherein the particulate distribution structure includes a rotating member configured to distribute the particulate material.

3. The test system of claim 2, wherein the particulate distribution structure further includes a screen structure positioned to receive the particulate material subsequent to the particulate material being distributed by the rotating member to further distribute the particulate material.

4. The test system of claim 3, wherein the rotating member is a first rotating member, and further wherein the particulate distribution structure includes a second rotating member positioned to receive the particulate material subsequent to the particulate material being distributed by the screen structure to further distribute the particulate material.

5. The test system of claim 1, wherein the particulate acceleration structure includes at least one of a gas eductor, a gas ejector, a venturi, and a reverse venturi.

6. The test system of claim 1, wherein the test system defines a straight particulate material supply conduit that extends at least between the distribution structure outlet and the test sample location.

7. The test system of claim 1, wherein the particulate flow axis is at least substantially vertical.

8. The test system of claim 1, wherein the test system further includes a particulate supply system configured to supply the supplied particulate stream at a particulate stream supply rate.

9. The test system of claim 8, wherein the particulate supply system further includes a feed mechanism configured to selectively vary the particulate stream supply rate.

10. The test system of claim 9, wherein the particulate supply system is configured to selectively regulate the particulate stream supply rate such that the accelerated particulate stream includes a target mass concentration of particulate material in the motive gas.

11. The test system of claim 1, wherein the test system further includes a containment structure configured to receive the accelerated particulate stream after the accelerated particulate stream is incident upon the test sample location.

12. The test system of claim 11, wherein the containment structure is configured to separate the particulate material in the accelerated particulate stream from the motive gas in the accelerated particulate stream, wherein the containment structure includes:
a gas discharge port, wherein the containment structure is configured to direct the motive gas from the accelerated particulate stream toward the gas discharge port as a gas discharge stream;
(ii) a particulate filter configured to remove the particulate material from the gas discharge stream prior to flow of the gas discharge stream from the containment structure; and
(iii) a particulate material retention region configured to retain the particulate material, wherein the containment structure further includes a particulate material discharge port configured to discharge the particulate material from the particulate material retention region.

13. The test system of claim 12, wherein the test system further includes a particulate material recycle structure configured to convey the particulate material from the particulate material retention region to a particulate supply system.

14. The test system of claim 1, wherein the test sample fixture includes a sample mounting structure configured to hold the test sample at the test sample location.

15. The test system of claim 1, wherein the test system further includes a view port configured to facilitate viewing of an internal region of the test system from external the test system while the test system is being utilized to test the test sample.

16. The test system of claim 15, wherein the test system further includes a particulate material concentration detection structure associated with the view port and configured to detect a concentration of particulate material within the internal region of the test system.

17. The test system of claim 1, wherein the test system includes the particulate material, wherein the particulate material defines an effective particle diameter of at least 5 micrometers and at most 100 micrometers.

18. A method of utilizing the test system of claim 1, the method comprising:
providing the supplied particulate stream to the particulate distribution structure;
distributing, within the particulate distribution structure, the supplied particulate stream to generate the distributed particulate stream;
discharging the distributed particulate stream from the particulate distribution structure;
accelerating the distributed particulate stream with the particulate acceleration structure to generate the accelerated particulate stream; and
flowing the accelerated particulate stream incident upon the test sample to erode the test sample.

19. The method of claim 18, wherein the providing the supplied particulate stream includes selectively varying a particulate stream supply rate of the supplied particulate stream to regulate a concentration of the particulate material in the accelerated particulate stream based, at least in part, on an expected downhole environment for the test sample.

20. A test system for evaluating erosion of a test sample, the test system comprising:
- a particulate distribution structure having a distribution structure inlet, which is configured to receive a supplied particulate stream that includes particulate material, and a distribution structure outlet, which is oriented along a particulate flow axis of the test system and is configured to discharge a distributed particulate stream, wherein the particulate distribution structure is configured to distribute the supplied particulate stream such that the particulate material is at least substantially uniformly distributed within the distributed particulate stream;
- a particulate acceleration structure having an acceleration structure inlet arranged along the particulate flow axis, an acceleration structure outlet arranged along the particulate flow axis, and a motive gas inlet, wherein the particulate acceleration structure is configured to receive the distributed particulate stream via the acceleration structure inlet, to receive a motive gas stream of a motive gas via the motive gas inlet, to combine the distributed particulate stream with the motive gas stream to accelerate the particulate material and generate an accelerated particulate stream, and to discharge the accelerated particulate stream from the acceleration structure outlet, wherein the particulate distribution structure includes a rotating member configured to distribute the particulate material and wherein the particulate distribution structure further includes a screen structure positioned to receive the particulate material subsequent to the particulate material being distributed by the rotating member to further distribute the particulate material; and
- a test sample fixture configured to hold the test sample at a test sample location that is positioned along the particulate flow axis such that the accelerated particle stream is incident upon the test sample location.

21. The test system of claim 20, wherein the rotating member is a first rotating member, and further wherein the particulate distribution structure includes a second rotating member positioned to receive the particulate material subsequent to the particulate material being distributed by the screen structure to further distribute the particulate material.

22. A test system for evaluating erosion of a test sample, the test system comprising:
- a particulate distribution structure having a distribution structure inlet, which is configured to receive a supplied particulate stream that includes particulate material, and a distribution structure outlet, which is oriented along a particulate flow axis of the test system and is configured to discharge a distributed particulate stream, wherein the particulate distribution structure is configured to distribute the supplied particulate stream such that the particulate material is at least substantially uniformly distributed within the distributed particulate stream;
- a particulate acceleration structure having an acceleration structure inlet arranged along the particulate flow axis, an acceleration structure outlet arranged along the particulate flow axis, and a motive gas inlet, wherein the particulate acceleration structure is configured to receive the distributed particulate stream via the acceleration structure inlet, to receive a motive gas stream of a motive gas via the motive gas inlet, to combine the distributed particulate stream with the motive gas stream to accelerate the particulate material and generate an accelerated particulate stream, and to discharge the accelerated particulate stream from the acceleration structure outlet, wherein the particulate acceleration structure includes at least one of a gas eductor, a gas ejector, a venturi, and a reverse venturi; and
- a test sample fixture configured to hold the test sample at a test sample location that is positioned along the particulate flow axis such that the accelerated particle stream is incident upon the test sample location.

* * * * *